US011508328B2

(12) United States Patent
Hur et al.

(10) Patent No.: US 11,508,328 B2
(45) Date of Patent: Nov. 22, 2022

(54) CIRCULAR DISPLAY DEVICE WITH NARROW BEZEL AND DRIVING METHOD THEREOF

(71) Applicant: LG Display Co., Ltd., Seoul (KR)

(72) Inventors: ChangLok Hur, Gumi-si (KR); DaeJin Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/933,945

(22) Filed: Jul. 20, 2020

(65) Prior Publication Data

US 2021/0110782 A1 Apr. 15, 2021

(30) Foreign Application Priority Data

Oct. 10, 2019 (KR) .................. 10-2019-0125701

(51) Int. Cl.
*G09G 5/00* (2006.01)
*G09G 3/36* (2006.01)
*G09G 3/34* (2006.01)

(52) U.S. Cl.
CPC ......... *G09G 3/3688* (2013.01); *G09G 3/3677* (2013.01); *G02F 2201/56* (2013.01);
(Continued)

(58) Field of Classification Search
CPC ............... G09G 3/3688; G09G 3/3677; G09G 2310/08; G09G 2310/0205;
(Continued)

(56) References Cited

U.S. PATENT DOCUMENTS 10,036,909 B2 7/2018 Tanaka et al.
10,304,395 B2 5/2019 Shima
(Continued)

FOREIGN PATENT DOCUMENTS

CN 106409864 A 2/2017
CN 107024788 A 8/2017
(Continued)

OTHER PUBLICATIONS

China National Intellectual Property Administration, Office Action, CN Patent Application No. 202010723511.1, dated Jan. 11, 2022, 19 pages.
(Continued)

*Primary Examiner* — Adam J Snyder
(74) *Attorney, Agent, or Firm* — Fenwick & West LLP

(57) ABSTRACT

Provided is a display device having the following structure and driving method thereof. The display device comprises a circular display panel including an active area on which an image is displayed and a non-active area on which no image is displayed, a gate driving circuit disposed in the non-active area to drive a plurality of gate lines, a first data driving circuit disposed in the non-active area to drive first-group data lines in the circular display panel, and a second data driving circuit disposed in the non-active area, in a position opposite to the first data driving circuit with respect to the active area, to drive second-group data lines in the circular display panel. The frequency of a data clock is reduced using a plurality of data driving circuits in a pad area. The bezel size of a circular display panel is reduced.

5 Claims, 11 Drawing Sheets

(52) U.S. Cl.
CPC ... *G09G 3/3406* (2013.01); *G09G 2300/0408* (2013.01); *G09G 2300/0426* (2013.01); *G09G 2310/0205* (2013.01); *G09G 2310/0262* (2013.01); *G09G 2310/0264* (2013.01); *G09G 2310/0281* (2013.01); *G09G 2310/08* (2013.01)

(58) Field of Classification Search
CPC ... G09G 2310/0281; G09G 2300/0408; G09G 2300/0426; G09G 2310/0264; G09G 3/3406; G09G 2310/0262; G02F 2201/56
See application file for complete search history.

(56) References Cited

U.S. PATENT DOCUMENTS

| | | | |
|---|---|---|---|
| 10,529,294 B2 | 1/2020 | Shima | |
| 10,916,208 B2 | 2/2021 | Shima | |
| 2008/0266210 A1* | 10/2008 | Nonaka | G11C 19/28 345/55 |
| 2010/0134743 A1* | 6/2010 | Shin | G09G 3/20 349/143 |
| 2013/0207134 A1* | 8/2013 | Shin | G02F 1/1345 257/88 |
| 2014/0253419 A1* | 9/2014 | Tanada | G09G 3/20 345/55 |
| 2016/0351098 A1 | 12/2016 | Lin et al. | |
| 2016/0351107 A1* | 12/2016 | Chen | G09G 3/20 |
| 2017/0032735 A1* | 2/2017 | Lee | G09G 3/32 |
| 2017/0061933 A1* | 3/2017 | Jang | G09G 3/2085 |
| 2017/0092171 A1* | 3/2017 | Knausz | G06F 3/04166 |
| 2017/0221434 A1* | 8/2017 | Shima | G09G 3/3688 |
| 2018/0031898 A1* | 2/2018 | Tanaka | G09G 3/3648 |
| 2019/0027090 A1* | 1/2019 | Nonaka | G09G 3/3225 |
| 2019/0228724 A1 | 7/2019 | Shima | |
| 2020/0066220 A1 | 2/2020 | Shima | |

FOREIGN PATENT DOCUMENTS

| | | | |
|---|---|---|---|
| CN | 107408360 A | 11/2017 | |
| CN | 109285493 A | 1/2019 | |
| CN | 109712558 A | 5/2019 | |
| JP | 10187097 A | * 7/1998 | ............. G09G 3/36 |

OTHER PUBLICATIONS

China National Intellectual Property Administration, Office Action, CN Patent Application No. 202010723511.1, dated Aug. 2, 2022, 21 pages.

* cited by examiner

CIRCULAR DISPLAY DEVICE WITH NARROW BEZEL AND DRIVING METHOD THEREOF

CROSS REFERENCE TO RELATED APPLICATION

This application claims priority from Republic of Korea Patent Application No. 10-2019-0125701, filed on Oct. 10, 2019, which is hereby incorporated by reference for all purposes as if fully set forth herein.

BACKGROUND

Field

Embodiments relate to a display device and a driving method thereof.

Description of Related Art

Display devices used in computer monitors, televisions (TVs), and the like include self-emissive displays, such as organic light emitting display (OLED), vacuum fluorescent display (VFD), field emission display (FED), and plasma display panel (PDP), as well as non-self-emissive displays, such as liquid crystal display (LCD), which require a light source.

Among the above, such a liquid crystal display includes two substrates provided with electric field generating electrodes and a dielectric anisotropy liquid crystal layer formed between the two substrates. The liquid crystal display may generate an electric field in the liquid crystal layer by applying a voltage to the electric field generating electrodes and adjust the magnitude of the electric field by varying the voltage, so as to adjust the light transmittance passing through the liquid crystal layer, thereby displaying an intended image.

Such a liquid crystal display includes a data driving circuit receiving image data from an external source and generating and supplying a data voltage of corresponding pixels to data lines of a liquid crystal display panel, a gate driving circuit generating and supplying a gate signal so that the pixels of the liquid crystal display panel are driven in a line by line manner, and a backlight unit disposed on the rear surface of the liquid crystal display panel to light the liquid crystal display panel.

Recently, light emitting diodes (LED) having merits, such as high luminous efficiency, a thin profile, and low power consumption, has come into prominence as a light source of the backlight unit.

A small liquid crystal display, such as a smartphone, has a rectangular display screen, and the shape of the liquid crystal display panel is also rectangular.

However, recently, the use of non-square display screens have been requested, as liquid crystal display has been used as display devices in a variety of fields, such as a watch (or wristwatch) or a dashboard of a vehicle. Accordingly, the liquid crystal display panel may have a circular structure or the like, rather than a rectangular structure.

In such a circular liquid crystal display, both an active area on which images are displayed and a non-active area on which no images are displayed are configured to be circular. Here, rectangular pixels having the same size are disposed as a matrix structure in the active area to form a circular display panel.

In addition, in the liquid crystal display, input and output data lines may be divided in parallel in order to reduce the high frequency of a data clock. Data may be simultaneously transmitted through the divided data lines, thereby reducing the driving frequency of the data driving circuit.

However, in the case of a circular display panel, because the vertical size of the active area is reduced in the direction from the central portion to the right and left portions, the surrounding area of the active area may be increased when the data driving circuit is disposed continuously on a horizontal pad. Accordingly, the size of the display panel may be increased, thereby making it difficult to reduce the size of the display device.

SUMMARY

Embodiments of the present disclosure may provide a display device having a structure able to reduce the bezel size of a circular display panel while reducing the frequency of a data clock using a plurality of data driving circuits, and a driving method thereof.

In addition, embodiments of the present disclosure may provide a display device allowing a plurality of data driving circuits to be disposed in opposite positions with respect to the display panel while enabling effective driving, and a driving method thereof.

According to an aspect, embodiments of the present disclosure may provide a display device including a circular display panel including an active area on which an image is displayed and a non-active area on which no image is displayed, a gate driving circuit disposed in the non-active area to drive a plurality of gate lines, a first data driving circuit disposed in the non-active area to drive first-group data lines in the circular display panel, and a second data driving circuit disposed in the non-active area, in a position opposite to the first data driving circuit with respect to the active area, to drive second-group data lines in the circular display panel.

According to an embodiment, the non-active area may include, a pad area in which the first data driving circuit and the second data driving circuit are disposed, and a bezel area disposed at an edge portion of the active area, with the one or more gate driving circuits being disposed in the bezel area.

According to an embodiment, the first-group data lines may be odd data lines, and the second-group data lines may be even data lines.

According to an embodiment, the first data driving circuit and the second data driving circuit may alternately apply a data voltage to the first-group data lines and the second-group data lines.

According to an embodiment, the first-group data lines may be data lines located in a left portion of the active area, and the second-group data lines may be data lines located in a right portion of the active area.

According to an embodiment, the first data driving circuit and the second data driving circuit may sequentially apply a data voltage to the first-group data lines and the second-group data lines.

According to another aspect, embodiments of the present disclosure may provide a method of driving a display device including in a circular display panel including an active area on which an image is displayed and a non-active area on which no image is displayed, disposing a first data driving circuit driving first-group data lines in the non-active area and a second data driving circuit driving second-group data lines in the non-active area, in a position opposite to the first data driving circuit with respect to the active area; and applying, by the first data driving circuit and the second data driving circuit, a data voltage to the first-group data lines and the second-group data lines.

According to an embodiment, in the application of the data voltage, the first data driving circuit and the second data driving circuit may alternately apply the data voltage to the first-group data lines and the second-group data lines.

According to an embodiment, in the application of the data voltage, the first data driving circuit and the second data driving circuit may sequentially apply the data voltage to the first-group data lines and the second-group data lines.

According to another aspect, embodiments of the present disclosure may provide a display device including a circular display panel including an active area on which an image is displayed and a non-active area on which no image is displayed, a gate driving circuit disposed in the non-active area to drive a plurality of gate lines, a first data driving circuit disposed in the non-active area to drive first-group data lines in the circular display panel, and a second data driving circuit disposed adjacently to the first data driving circuit and in a direction not parallel to the first data driving circuit in the non-active area, to drive second-group data lines in the circular display panel.

According to an embodiment, the first data driving circuit and the second data driving circuit may be disposed perpendicular to a radius of the circular display panel.

In the display device and the driving method thereof according to exemplary embodiments, the bezel size of a circular display panel may be reduced, and the frequency of a data clock may be reduced using a plurality of data driving circuits.

In the display device and the driving method thereof according to exemplary embodiments, a plurality of data driving circuits may be disposed in opposite positions, on both sides of the display panel, and effective driving may be enabled.

BRIEF DESCRIPTION OF THE DRAWINGS

The above and other objects, features, and advantages of the present disclosure will be more clearly understood from the following detailed description, taken in conjunction with the accompanying drawings.

DETAILED DESCRIPTION

Figure 1:
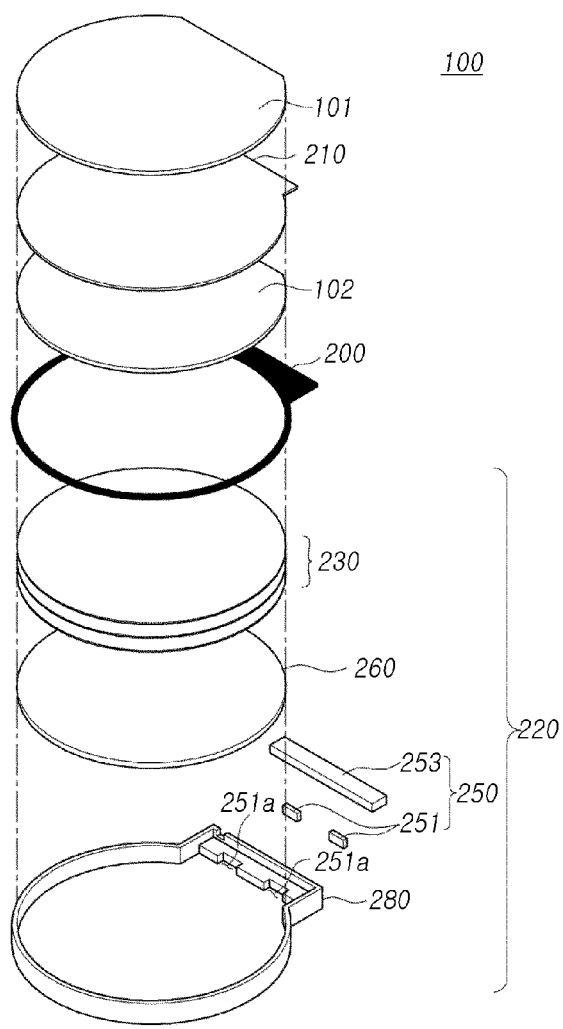
FIG. 1 is a perspective view illustrating a circular display device according to an embodiment.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 is a perspective view illustrating a circular display device according to an embodiment.

Referring to FIG. 1, the circular display device 100 may include a display panel 210 displaying images and a backlight unit 220 disposed on the rear side of the display panel 210 to light the display panel 210.

An upper polarizer 101 and a lower polarizer 102, the optical axes of which perpendicularly intersect each other, may be attached to the upper and lower surfaces of the display panel 210, respectively.

The display panel 210 may be comprised of a thin-film transistor (TFT) array substrate, a color filter substrate attached to the TFT array substrate in an opposing manner, and a liquid crystal layer situated between the TFT array substrate and the color filter substrate.

The TFT array substrate includes a plurality of pixels arrayed in the form of a matrix. The plurality of pixels may respectively include a gate line extending in a first direction, a data line extending in a second direction perpendicular to the first direction to intersect the gate line and insulated from the gate line, and a pixel electrode. In addition, a thin-film transistor may be provided in each of the pixels to be connected to the gate line, the data line, and the pixel electrode.

On the color filter substrate, red, green, and blue (RGB) subpixels representing colors of the pixels may be provided by thin film processing, and a common electrode opposing the pixel electrode may be provided. Accordingly, the liquid crystal molecules in the liquid crystal layer may be oriented by voltages applied to the pixel electrode and the common electrode, thereby adjusting the light transmittance provided by the backlight unit 220.

The display panel 210 may have a circular structure in which the image display surface thereof is circular, and may have a protruding structure on one side portion thereof.

The backlight unit 220 located below the display panel 210 may include a support main 280 having the shape of an upwardly open mold, a light source unit 250 disposed on a side portion of the support main 280, a light guide plate 260 disposed side by side with the light source unit 250, and an optical sheet 230 disposed on the light guide plate 260.

The optical sheet 230 may diffuse and condense light incident from the light guide plate 260 and emit the light in the direction of the display panel 210. The optical sheet 230 may have an overall circular shape.

The light guide plate 260 serves to convert point light into surface light. The light guide plate 260 converts point light applied from the light source unit 250 disposed on the side portion of the support main 280 into surface light and guides the light in the direction of the display panel 210. Here, the entirety of the light guide plate 260 may be circular.

The light source unit 250 may include a flexible printed circuit board (FPCB) 253 and a plurality of light emitting diodes (LEDs) 251 mounted on the lower surface of the flexible printed circuit board 253. The flexible printed circuit board 253 is a circuit board provided by forming a complicated circuit on a flexible insulating film. The flexible insulating film may be a heat resistant plastic film made of a soft material, such as polyester or polyimide.

The support main 280 may have the shape of an upwardly open mold, and the entire area of the support main 280, except for an area corresponding to the light source unit 250, may have a circular shape.

The support main 280 may accommodate the light guide plate 260, the optical sheet 230, and the light source unit 250 therein. In addition, a plurality of recesses 251a accommodating the plurality of light emitting diodes 251 may be provided in portions of the support main 280 corresponding to the light source unit 250.

A shade tape 200 may be provided above the backlight unit 220 having the above-described structure.

The area of the shade tape 200 corresponds to the light source unit 250 of the backlight unit 220 and the edge portion of the support main 280. The shade tape 200 serves to fix the optical sheet 230 and the light source unit 250 to the support main 280.

In addition, the shade tape 200 has an adhesive applied to both surfaces thereof to fix the backlight unit 220 and the display panel 210, and the entire portion of the shade tape 200 is black to prevent light incident from the backlight unit 220 from exiting therethrough.

The lower polarizer 102 allowing a specific wavelength component of light incident from the backlight unit 220 to pass therethrough is attached to the lower surface of the display panel 210. The upper polarizer 101 allowing a specific wavelength component of light traveling upwardly in the display panel 210 to pass therethrough is attached to the upper surface of the display panel 210.

The display panel 210 is divided into an active area on which images are displayed and a non-active area located at the edge of the active area, with no images being displayed on the non-active area. A gate driving circuit providing a scan signal to gate lines of the display panel 210 and a data driving circuit providing a data voltage to data lines of the display panel 210 may be located in the non-active area.

Although the liquid crystal display requiring a light source has been described as an example herein, it should be understood that embodiments may be applied to other self-emissive display devices, such as an organic light-emitting displays (OLED).

Figure 2:
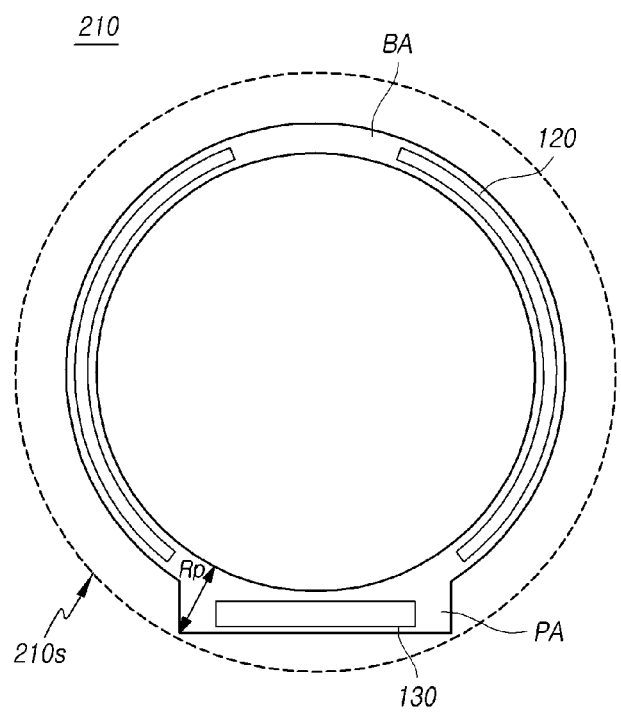
FIG. 2 is a schematic view illustrating a structure of the circular display panel according to an embodiment.

FIG. 2 is a schematic view illustrating a structure of the circular display panel according to an embodiment.

Referring to FIG. 2, in a case in which the display device 100 is used in a wristwatch or the like, the display panel 210 may have a circular structure or an elliptical structure having a predetermined curvature.

For example, the display panel 210 according to embodiments may include a circular display panel, all radial distances of which are equidistant from the center of the active area AA, or an elliptical display panel having a major axis and a minor axis of different lengths.

A plurality of subpixels may be disposed in the active area AA of the display panel 210. A pad area PA and a bezel area BA may be provided at the edge of the active area AA. The pad area PA may accommodate a data driving circuit 130 applying a data voltage to the subpixels, and signal lines may be disposed in the bezel area BA.

In a case of a circular active area AA, the signal lines disposed in the bezel area BA may extend along curves surrounding the active area AA. The signal lines provided in the bezel area BA may include driving voltage lines through which a driving voltage is supplied to the subpixels, base voltage lines through which a base voltage is supplied to the subpixels, reference voltage lines through which a reference voltage is supplied, data voltage lines through which a data voltage is supplied, and the like.

Here, a gate driving circuit 120 supplying the scan signal to the subpixels may be comprised of a plurality of segments located in the bezel area BA.

A plurality of gate lines extending in a first direction, for example, a horizontal direction may be disposed in the active area AA. The gate lines may be disposed at predetermined distances from each other in a second direction, for example, a vertical direction of the active area AA.

The gate lines may be connected to the gate driving circuit 120 to supply the scan signals provided by the gate driving circuit 120, to the subpixels, respectively.

In addition, a plurality of data lines extending in the second direction, for example, the vertical direction may be disposed in the active area AA. The data lines may be disposed at predetermined distances from each other in the first direction, for example, the horizontal direction of the active area AA.

Some of the data lines directly extend from the data driving circuit 120 to the active area AA, and the remaining data lines may extend sideways along the bezel area BA to provide the data voltage to the subpixels.

Accordingly, in the active area AA, the plurality of gate lines and the plurality of data lines are arrayed in the form of a matrix such that the gate lines intersect the data lines, and the subpixels are provided in areas in which the gate lines intersect the data lines.

In addition, a plurality of pads made of a metal may be provided in the pad area PA, in the shape of a strip extending toward the active area AA. The plurality of pads may be disposed in a line in the circumferential direction of the active area AA. The data driving circuit 130 providing the data voltage or the like to the data lines may be connected to the pad area PA.

The data driving circuit 130 may be implemented using a chip-on-film (COF) structure.

In the data driving circuit 130 having the COF structure, a data driving circuit chip may be mounted on the film of the data driving circuit, and metal strip pads may be provided on both ends of the film to be electrically connected to the data driving circuit chip.

Here, the bezel area BA, within which the gate driving circuit 120 and the gate lines are disposed, is formed along the edge of the active area AA and has an expanded structure in the shape of a circle along with the active area AA.

In contrast, the pad area PA, on which the data driving circuit 130 is mounted, protrudes from one portion, i.e. the lower portion, of the active area AA. In a case in which the circular display panel 210 includes the pad area PA, the outer shape 210S of the display panel 210 is determined by the radial distance Rp from the active area AA to the outermost portion of the pad area PA.

Accordingly, the size of the outer shape 210S of the circular display panel 210 is increased, since the outer portion includes an unnecessary area outside the bezel area BA.

This phenomenon is more significant in a case in which the data lines are divided and the data driving circuit 130 is comprised of a plurality of circuits in order to reduce the frequency of the data clock. In particular, in a case in which the plurality of data driving circuits 130 are sequentially arrayed in a line in a single direction, the length of the pad area PA is necessarily increased.

Figure 3:
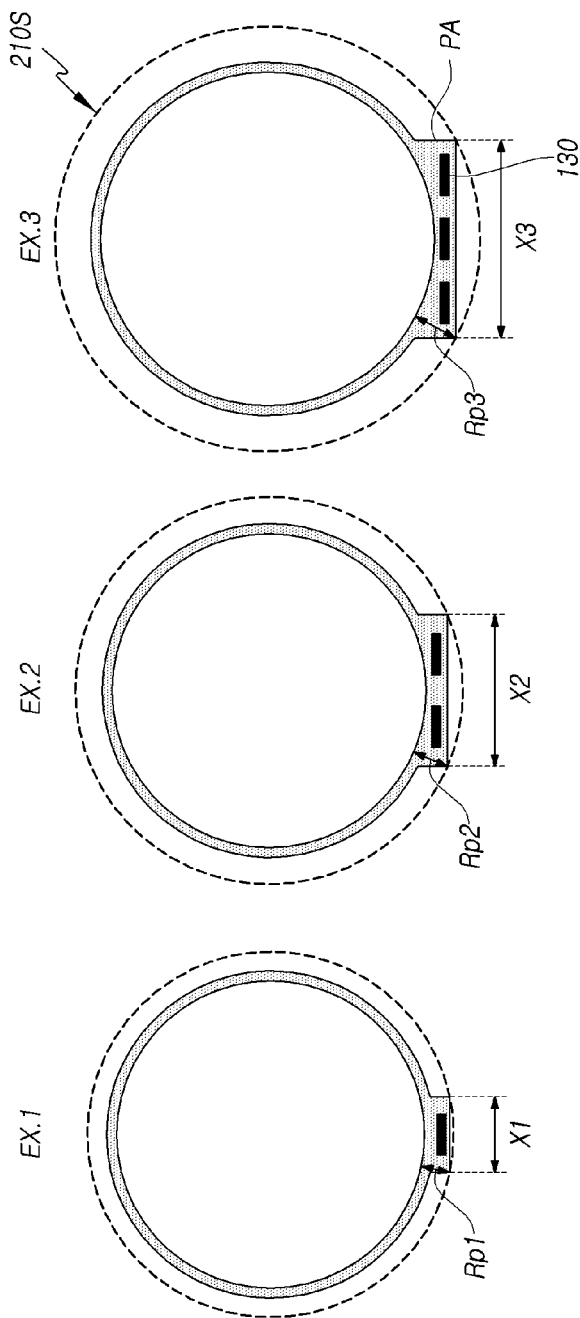
FIG. 3 is a schematic view illustrating examples in which the outer shape of the circular display panel increases depending on the size of the pad area on which the data driving circuit is disposed according to an embodiment.

FIG. 3 is a schematic view illustrating examples in which the outer shape of the circular display panel increases depending on the size of the pad area on which the data driving circuit is disposed according to embodiments.

Referring to FIG. 3, a single data driving circuit 130 may be disposed in the pad area PA of the circular display panel 210 ("EX.1" in FIG. 3), or two data driving circuits 130 ("EX.2" in FIG. 3) or three data driving circuits 130 ("EX.3" in FIG. 3) may be provided as required.

Since the outer shape 210S of the display panel 210 includes the pad area PA in which the data driving circuit 130 is located, the width X of the pad area PA increases with increases in the number or length of the data driving circuits 130, thereby increasing the radial distance Rp from the active area AA to the outermost portion of the pad area PA.

That is, with increases in the number of the data driving circuits 130 disposed in the pad area PA, the width X of the pad area PA increases (X3>X2>X1), and the radial distance Rp from the active area AA to the outermost portion of the pad area PA increases (Rp3>Rp2>Rp1). Consequently, the thickness of the bezel area BA increases, and the size of the outer shape 210s of the display panel 210 increases.

To overcome this problem, the display device 100 according to embodiments may be configured such that divided data driving circuits 130 are disposed in opposite positions on both sides of the display panel 210, in order to reduce the size of the pad area PA and the bezel area BA and reduce the size of the outer shape 210s of the display panel 210, and that the circular display panel 210 may be simultaneously driven by the divided data driving circuits 130.

Figure 4:
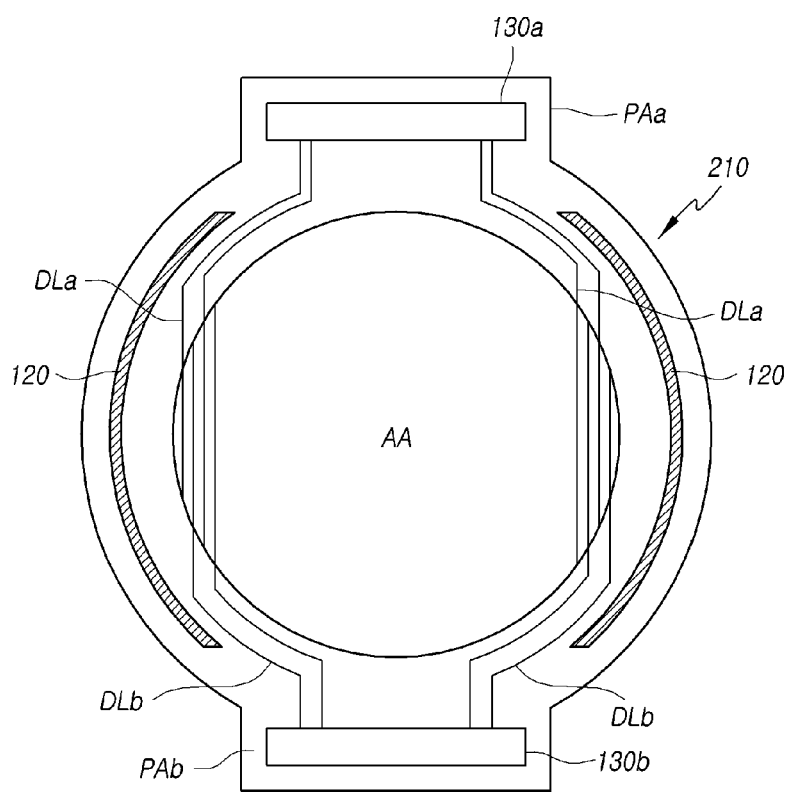
FIG. 4 is a schematic view illustrating a structure of the circular display panel in the display device according to embodiments.

FIG. 4 is a schematic view illustrating a structure of the circular display panel in the display device according to embodiments.

Referring to FIG. 4, the display device 100 according to embodiments may include the circular display panel 210, the gate driving circuit 120, and the data driving circuit 130.

The display panel 210 of the display device 100 is divided into the active area AA on which images are displayed and the non-active area located at the edge of the active area AA and on which no images are displayed.

The display panel 210 has a circular structure, and thus, the active area AA in which a plurality of pixels are disposed has a circular structure.

The non-active area may include the pad area PA located at the edge of the active area AA and in which the data driving circuit 130 applying the data voltage to the pixels is disposed and the bezel area BA in which one or more gate driving circuits 120 are disposed to apply the scan signal to the pixels through the signal lines.

Herein, the data driving circuits 130a and 130b are illustrated as being disposed in the pad areas PA located upper and lower portions of the display panel 210.

The pad areas PA may be quadrangular areas having a predetermined size, extending or protruding from the bezel area BA in the upper or lower of the display panel 210.

The circular display panel 210 includes a pixel array provided in the active area AA. The pixel array includes the plurality of gate lines spaced apart from each other by predetermined distances, the plurality of data lines DL spaced apart from each other by predetermined distances and intersecting the plurality of gate line, and the plurality of pixels.

The plurality of pixels may be disposed in the circular active area AA, in the shape of a matrix. Some of the plurality of pixels, adjacent to the bezel area BA located at the edge of the active area AA, may be disposed in the shape of stairs along the circumference of the active area AA.

Each of the plurality of pixels as described above may include a light emitting element, such as an organic light emitting diode.

In a TFT fabrication process of forming the pixels, the gate driving circuit 120 is provided in the bezel area BA to have the shape of an arc extending along the circumference of the display panel 210 and is connected to each of the plurality of gate lines.

The gate driving circuit 120 generates a gate signal and supplies the gate signal sequentially to the plurality of gate line, in response to a gate control signal supplied through a gate control signal line. For example, the gate driving circuit may be provided along the right or left circumferential portion of the display panel 210 to supply the gate signal to one or the other end of each of the plurality of gate lines.

The data driving circuit 130 may include the first data driving circuit 130a located in an upper pad area PAa of the display panel 210 and the second data driving circuit 130b located in a lower pad area PAb of the display panel 210.

The entire data lines DL provided in the display panel 210 may be divided into two groups, which are connected to the first data driving circuit 130a and the second data driving circuit 130b. For example, odd data lines among the entire data lines DL may be categorized as first-group data lines DLa, and even data lines among the entire data lines DL may be categorized as second-group data lines DLb. In this case, the first-group data lines DLa are connected to the first data driving circuit 130a, while the second-group data lines DLb are connected to the second data driving circuit 130b.

Thus, the first data driving circuit 130a applies the data voltage to the display panel 210 sequentially through the odd first-group data lines DLa, while the second data driving circuit 130b applies the data voltage to the display panel 210 sequentially through the even second-group data lines DLb.

A timing controller (not shown) may divide the data voltage into odd data voltages and an even data voltages to be applied to the first data driving circuit 130a and the second data driving circuit 130b, respectively, so that the externally supplied data voltage is supplied to the display panel 210.

Figure 5:
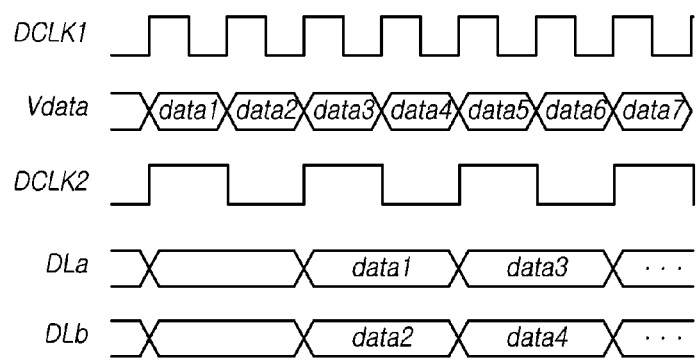
FIG. 5 is a schematic diagram illustrating signal timing on a display panel in the display device according to embodiments, in which the signals are applied by dividing a data voltage using a plurality of data driving circuits.

FIG. 5 is a schematic diagram illustrating signal timing on a display panel in the display device according to embodiments, in which the signals are applied by dividing a data voltage using a plurality of data driving circuits.

Referring to FIG. 5, in the display device 100 according to embodiments, a data voltage Vdata for the pixels applied by the timing controller may be in synchronization with a first data clock DCLK1.

The timing controller may latch the data voltage Vdata applied according to the first data clock DCLK1, and divide the data voltage Vdata into odd data voltages data1, data3, and . . . and even data voltages data2, data4, and . . . . Also, the timing controller may synchronize the divided data voltages with a second data clock DCLK2 having the frequency of which is equal to the half of that of the first data clock DCLK1, and supply the odd data voltages to the first data driving circuit 130a and the even data voltages to the second data driving circuit 130b.

Consequently, alternating driving may be performed so that the odd data voltages data1, data3, and . . . may be sequentially supplied to the display panel 210 through the odd first-group data lines DLa connected to the first data driving circuit 130a and the even data voltages data2, data4, and . . . may be sequentially supplied to the display panel 210 through the even second-group data lines DLb connected to the second data driving circuit 130b.

In addition, the data voltage Vdata may be applied in an alternating manner to the red (R), green (G), and blue (B) subpixels of each of the pixels.

Figure 6:
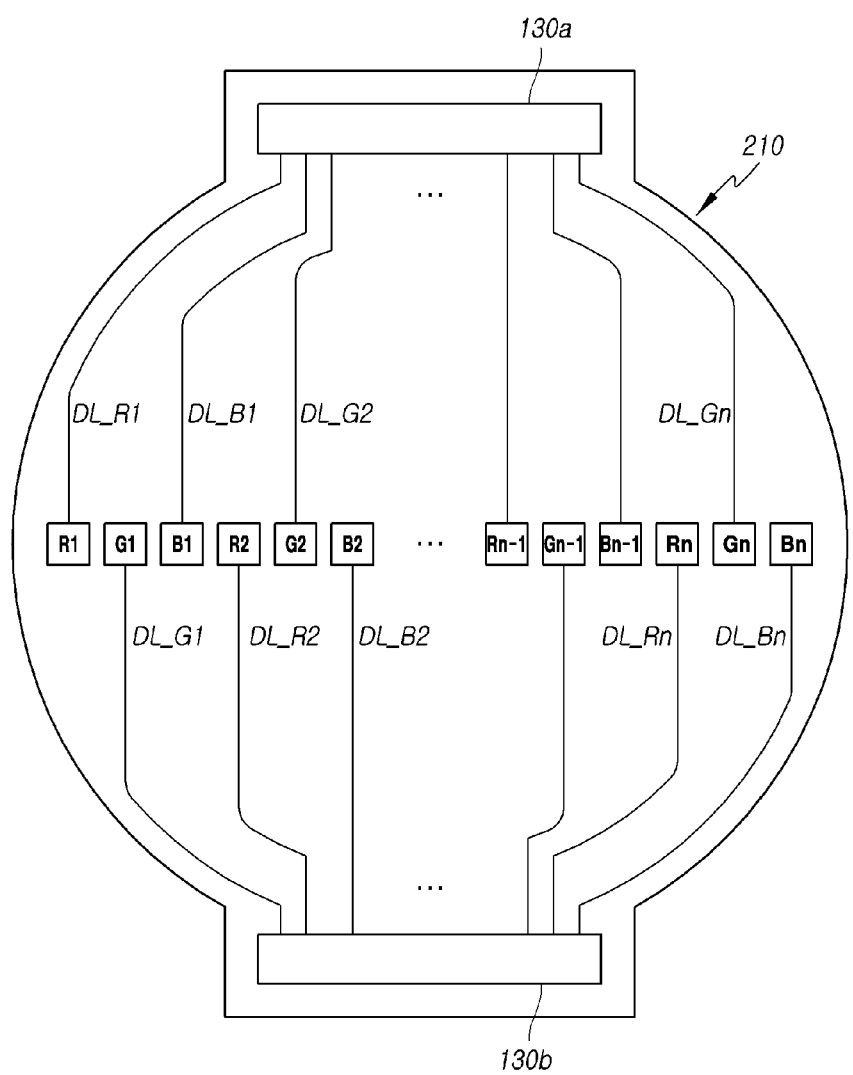
FIG. 6 is a schematic view illustrating the display panel of the display device according to embodiments in a case in which the data lines are divided according to the subpixels to be connected to a plurality of data driving circuits.

FIG. 6 is a schematic view illustrating the display panel of the display device according to embodiments in a case in which the data lines are divided according to the subpixels to be connected to a plurality of data driving circuits.

Referring to FIG. 6, the plurality of pixels of the active area AA in the display device 100 according to embodiments may be respectively comprised of red (R), green (G), and blue (B) subpixels.

The subpixels may be arranged in the order of red, green, and blue, or may be arranged in different orders.

In a case in which the subpixels are arranged in the order of red, green, and blue, a first data line DL_R1 may correspond to a red subpixel, a second data line DL_G1 may correspond to a green subpixel, and a third data line DL_B1 may correspond to a blue subpixel. In addition, a fourth data line DL_R2 may correspond to the next red subpixel. In this manner, the data lines may sequentially correspond to the red, green, and blue subpixels.

Accordingly, the subpixels in odd positions may be connected to the first data driving circuit 130a through the odd first-group data lines DLa, while the subpixels in even positions may be connected to the second data driving circuit 130b through the even second-group data lines DLb.

Since the subpixels connected to the first data driving circuit 130a and the subpixels connected to the second data driving circuit 130b are separated from each other, the first data driving circuit 130a and the second data driving circuit 130b may be simultaneously driven.

Figure 7:
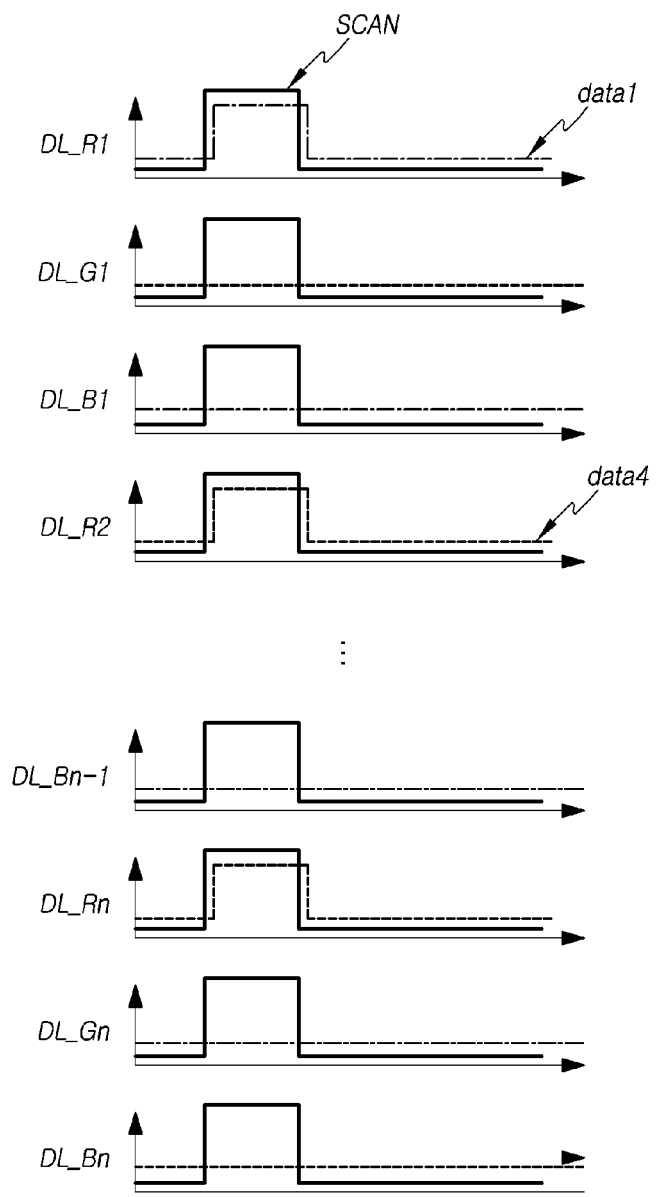
FIG. 7 is a waveform diagram of data voltages applied to the data lines in a case in which the display panel of the display device according to embodiments is alternately driven by a plurality of data driving circuits according to embodiments.

FIG. 7 is a waveform diagram of data voltages applied to the data lines in a case in which the display panel of the display device according to embodiments is alternately driven by a plurality of data driving circuits.

Referring to FIG. 7, in the display device 100 according to embodiments, at a point in time at which a scan signal SCAN is supplied to a specific subpixel through a gate line, the driving transistor of the specific subpixel is turned on, and light is emitted by a data voltage Vdata input through a data line DL at a point in time at which the driving transistor is turned on.

Accordingly, the emission timing of the subpixel may be determined such that a point in time at which the data voltage Vdata is applied overlaps a point in time at which scan signal SCAN is applied.

Here, each the pixels may be comprised of red, green, and blue subpixels, which are arranged in a variety of orders, and the data voltages Vdata applied to the subpixels may be applied in a variety of orders. Here, it will be assumed that the data voltages Vdata are applied sequentially to the red, green, and blue subpixels.

Thus, at a point in time at which the scan signal SCAN is applied to the first data line DL_R1 corresponding to the first red subpixel, the first data voltage data1 having a high level is applied from the first data driving circuit 130a, so that the subpixel emits light.

Here, since the subpixel to which the second data line DL_G1 is connected corresponds to a green subpixel, the second data driving circuit 130b applies the second data voltage data2 having a low level to the subpixel, so that the subpixel does not emit light.

In addition, since the subpixel to which the third data line DL_B1 is connected corresponds to a blue subpixel, the first data driving circuit 130a applies the third data voltage data3 having a low level to the subpixel, so that the subpixel does not emit light.

In contrast, since the subpixel to which the fourth data line DL_R2 is connected corresponds to a red subpixel, the second data driving circuit 130*b* applies the fourth data voltage data4 having a high level to the subpixel, so that the subpixel emits light.

Here, both the first data driving circuit 130*a* and the second data driving circuit 130*b* may be simultaneously driven, so that the scan signal SCAN and the data voltages data1 and data2 may be applied to the first data line DL_R1 and the second data line DL_G1 at the same point in time.

Figure 8:
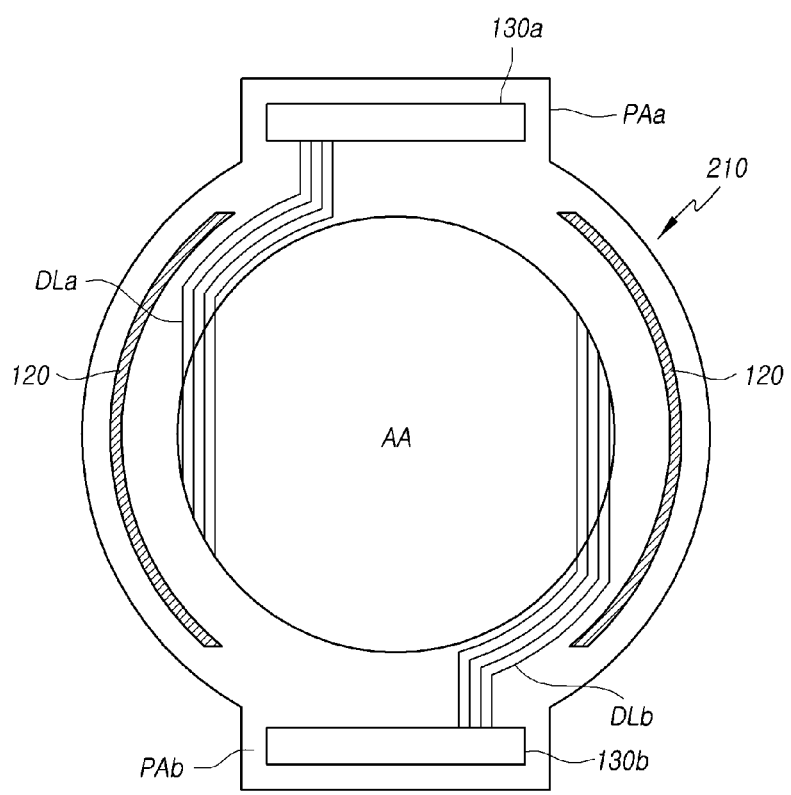
FIG. 8 is a schematic view illustrating another structure of the circular display panel in the display device according to embodiments.

FIG. 8 is a schematic view illustrating another structure of the circular display panel in the display device according to embodiments.

Referring to FIG. 8, the display device 100 according to embodiments may include the circular display panel 210, the gate driving circuit, and the data driving circuit 130.

The structures of the display panel 210, the gate driving circuit, and the data driving circuits 130*a* and 130*b* disposed in the pad area PA are the same or similar as those described above.

Here, the first-group data lines DLa corresponding to one half of the entire data lines, disposed in the left area of the display panel 210, are connected to the first data driving circuit 130*a* of the upper pad area PAa, while the second-group data lines DLb corresponding to the other half of the entire data lines, disposed in the right area of the display panel 210, are connected to the second data driving circuit 130*b* of the lower pad area PAb.

Accordingly, the first data driving circuit 130*a* sequentially applies the data voltage to the display panel 210 through the first-group data lines DLa disposed in the left area of the display panel 210, while the second data driving circuit 130*b* sequentially applies the data voltage to the display panel 210 through the second-group data lines DLb disposed in the right area of the display panel 210.

The timing controller (not shown) may be configured to supply the externally supplied data voltage to the display panel 210. That is, the timing controller may divide the data voltage into a data voltage to be applied to the left screen portion of the display panel 210 and a data voltage to be applied to the right screen portion of the display panel 210 and apply the divided data voltages to the first data driving circuit 130*a* and the second data driving circuit 130*b*, respectively.

Due to this structure in which the data lines DL are divided into two or more areas, the divided areas may be driven independently. Accordingly, it is possible to divide the display panel 210 into the left area and the right area, and image display may be performed separately on the left area and the right area.

Figure 9:
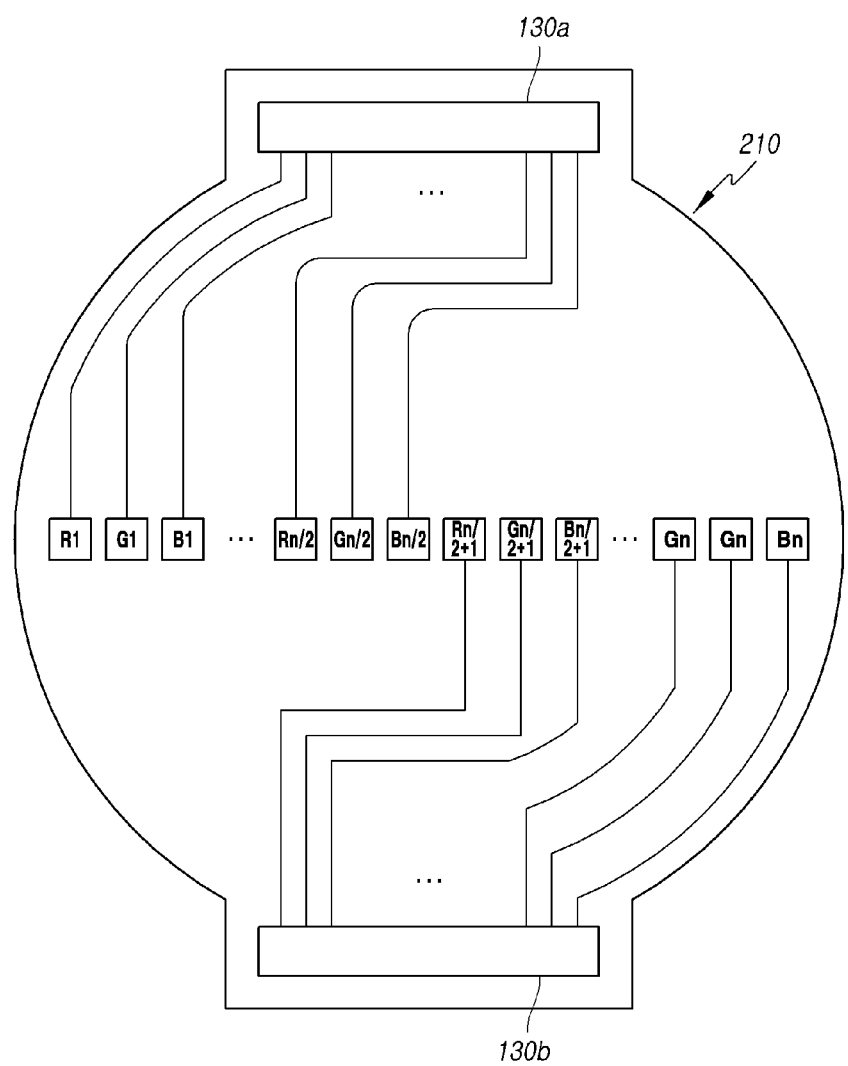
FIG. 9 is a schematic diagram illustrating the display panel of the display device according to embodiments in a case in which the data lines are divided according to the areas of the display panel and are connected to a plurality of data driving circuits.

FIG. 9 is a schematic diagram illustrating the display panel of the display device according to embodiments in a case in which the data lines are divided according to the areas of the display panel and are connected to a plurality of data driving circuits.

Referring to FIG. 9, each of the plurality of pixels of the active area AA in the display device 100 according to embodiments may include red (R), green (G), and blue (B) subpixels.

The subpixels may be arranged in the order of red, green, and blue, or may be arranged in different orders.

In a case in which the subpixels are arranged in the order of red, green, and blue, the data lines connected to one half of the subpixels disposed in the left portion of the active area AA correspond to the first-group data lines DLa, while the data lines connected to the other half of the subpixels disposed in the right portion of the active area AA correspond to the second-group data lines DLb.

Accordingly, the subpixels located in the left portion of the active area AA may be connected to the first data driving circuit 130*a* through the first-group data lines DLa, while the subpixels located in the right portion of the active area AA may be connected to the second data driving circuit 130*b* through the second-group data lines DLb.

Since the subpixels connected to the first data driving circuit 130*a* and the subpixels connected to the second data driving circuit 130*b* are separated from each other, the first data driving circuit 130*a* and the second data driving circuit 130*b* may be independently driven or simultaneously driven.

Figure 10:
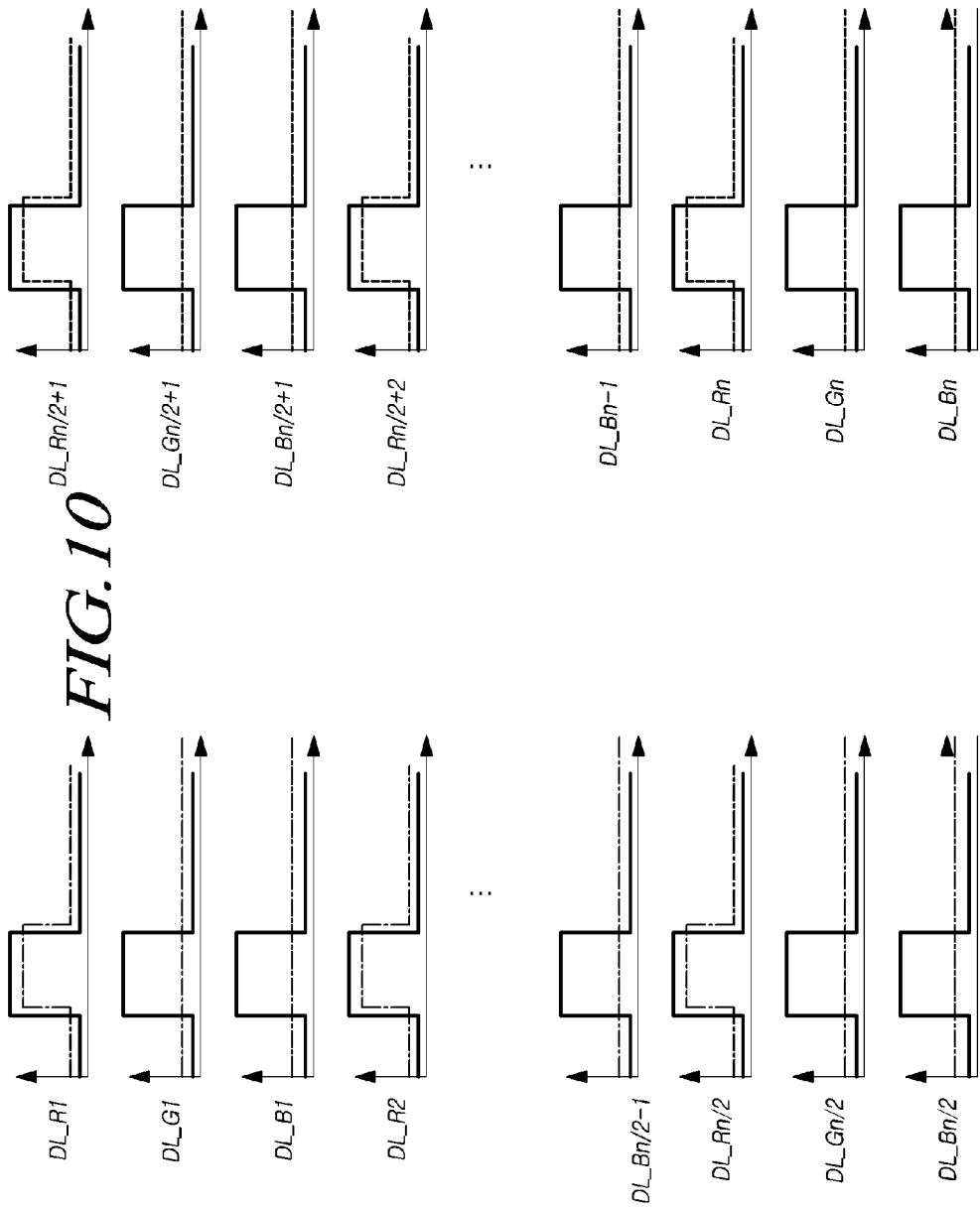
FIG. 10 is a waveform diagram illustrating data voltages applied to the divided areas of the display panel through a plurality of data driving circuits in the display device according to embodiments.

FIG. 10 is a waveform diagram illustrating data voltages applied to the divided areas of the display panel through a plurality of data driving circuits in the display device according to embodiments.

Referring to FIG. 10, in the display device 100 according to embodiments, at a point in time at which a scan signal SCAN is input to a specific subpixel through a gate line, the driving transistor of the specific subpixel is turned on, and light is emitted by a data voltage Vdata input through a data line DL at a point in time at which the driving transistor is turned on.

Accordingly, the emission timing of the subpixel may be determined such that a point in time at which the data voltage Vdata is applied overlaps a point in time at which scan signal SCAN is applied.

Here, each the pixels may be comprised of red, green, and blue subpixels, which are arranged in a variety of orders, and the data voltages Vdata applied to the subpixels may be applied in a variety of orders. Here, it will be assumed that the data lines located in the left area of the display panel 210 are divided as the first-group data lines DLa connected to the first data driving circuit 130*a* and the data lines located in the right area of the display panel 210 are divided as the second-group data lines DLb connected to the second data driving circuit 130*b*, so that the data voltages Vdata are applied sequentially to the subpixels.

Thus, regarding specific data lines among the entire data lines provided in the display panel 210, i.e. data lines from the data line DL_R1 corresponding to the first red subpixel in the left area to the data line DL_Bn/2 corresponding to the (n/2)th blue subpixel in the left area, subpixels receiving high level data voltages Vdata from the first data driving circuit 130*a* emit light at a point in time at which the scan signal SCAN is applied.

In this case, the first data driving circuit 130*a* applies the data voltages to the red subpixels.

In the same manner, regarding specific data lines among the entire data lines provided in the display panel 210, i.e. data lines from the data line DL_Rn/2+1 corresponding to the first red subpixel in the right area to the data line DL_Bn corresponding to the nth blue subpixel in the right area, subpixels receiving high level data voltages Vdata from the second data driving circuit 130*b* emit light at a point in time at which the scan signal SCAN is applied.

In this case, the second data driving circuit 130*b* applies the data voltages to the red subpixels.

As described above, dividing the data driving circuit 130 into the first data driving circuit 130*a* and the second data driving circuit 130*b*, and disposing them respectively in the upper pad area PAa and the lower pad area PAb of the circular display panel 210 may reduce the area of the pad area PA, so that the size of the display device 100 may be reduced.

In addition, even in the case in which the entirety of the plurality of data driving circuits 130*a* and 130*b* are disposed at one side of the circular display panel 210, the directions of arrangement of the data driving circuits 130a and 130b may be adjusted to reduce the size of the pad area PA.

Figure 11:
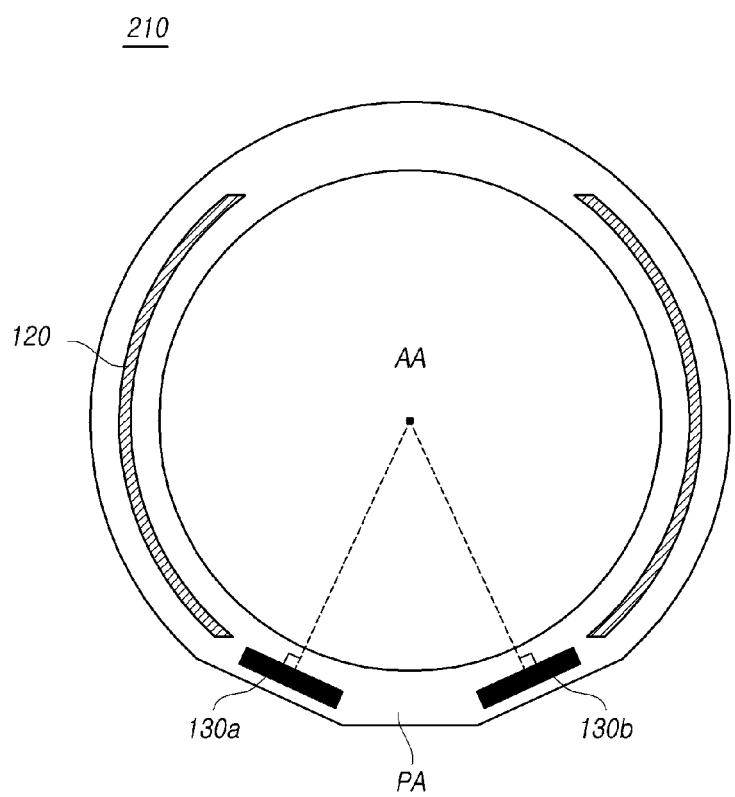
FIG. 11 is a schematic view illustrating another structure of the circular display panel in the display device according to embodiments.

FIG. 11 is a schematic view illustrating another structure of the circular display panel in the display device according to embodiments.

Referring to FIG. 11, the display device 100 according to embodiments may include the circular display panel 210, the gate driving circuit, and the data driving circuit 130.

The structures of the display panel 210 and the gate driving circuit 120 are the same or similar as those described above.

As a difference, the entirety of the plurality of data driving circuits 130a and 130b are disposed together in one portion of the pad area PA of the circular display panel 210.

In this case, the first data driving circuit 130a and the second data driving circuit 130b may be arranged in the form of "V" with respect to the center of the data driving circuit 130, instead of being in parallel to each other in one direction, so as to reduce the size of the pad area PA.

In particular, the first data driving circuit 130a and the second data driving circuit 130b may be oriented perpendicular to the radius of the circular display panel 210.

In a case in which the data driving circuit 130 has the above-described structure, even when the data driving circuit 130 is comprised of a greater number of circuits, the width of the pad area PA may be minimized or reduced since the circuits are not disposed in a parallel line direction.

Accordingly, the size of the pad area PA may be minimized, and the outer shape of the circular display panel 210 may have a smaller size.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device comprising:
   a circular display panel including an active area on which an image is displayed and a non-active area on which no image is displayed;
   a gate driving circuit disposed in the non-active area to drive a plurality of gate lines;
   a first data driving circuit disposed in the non-active area to drive first-group data lines in the circular display panel; and
   a second data driving circuit disposed in the non-active area, in a position opposite to the first data driving circuit with respect to the active area, to drive second-group data lines in the circular display panel,
   wherein the first-group data lines are odd data lines divided according to subpixels, and the second-group data lines are even data lines divided according to the subpixels,
   wherein the first data driving circuit is configured to drive a first data line of the first-group data lines connected to subpixels of a first color, and the second data driving circuit is configured to drive a second data line of the second-group data lines connected to subpixels of a second color, and
   wherein at a time interval for emitting light from subpixels of the first color, the gate driving circuit applies a scan signal to a subpixel of the first color connected to the first data line and a subpixel of the second color connected to the second data line, and wherein the first data driving circuit directly applies a first data voltage of high-level to the first data line connected to the subpixel of the first color among the first-group data lines such that light is emitted from the subpixel of the first color and, simultaneously, the second data driving circuit directly applies a second data voltage of low-level to the second data line connected to the subpixel of the second color among the second-group data lines such that light is not emitted from the subpixel of the second color.

2. The display device according to claim 1, wherein the non-active area includes:
   a pad area in which the first data driving circuit and the second data driving circuit are disposed; and
   a bezel area disposed at an edge portion of the active area, with the gate driving circuit being disposed in the bezel area.

3. The display device of claim 1, wherein the non-active area includes a first pad area protruding from an upper portion of the active area and a second pad area protruding from a lower portion of the active area, wherein the first data driving circuit is disposed in the first pad area and the second data driving circuit is disposed in the second pad area, and wherein the first pad area and the second pad area each have a rectangular shape.

4. A method of driving a display device comprising:
   in a circular display panel including an active area on which an image is displayed and a non-active area on which no image is displayed, disposing a first data driving circuit driving first-group data lines which are odd data lines divided according to subpixels in the non-active area and a second data driving circuit driving second-group data lines which are even data lines divided according to subpixels in the non-active area, in a position opposite to the first data driving circuit with respect to the active area; and
   applying, by the first data driving circuit and the second data driving circuit, data voltages to the first-group data lines and the second-group data lines,
   wherein the first data driving circuit is configured to drive a first data line of the first-group data lines connected to subpixels of a first color, and the second data driving circuit is configured to drive a second data line of the second-group data lines connected to subpixels of a second color, and
   wherein at a time interval for emitting light from subpixels of the first color, the gate driving circuit applies a scan signal to a subpixel of the first color connected to the first data line and a subpixel of the second color connected to the second data line, and wherein the first data driving circuit directly applies a first data voltage of high-level to the first data line connected to the subpixel of the first color among the first-group data lines such that light is emitted from the subpixel of the first color and, simultaneously, the second data driving circuit directly applies a second data voltage of low-level to the second data line connected to the subpixel of the second color among the second-group data lines such that light is not emitted from the subpixel of the second color.

5. The method of claim 4, wherein the non-active area includes a first pad area protruding from an upper portion of the active area and a second pad area protruding from a lower portion of the active area, wherein the first data driving circuit is disposed in the first pad area and the second data driving circuit is disposed in the second pad area, and wherein the first pad area and the second pad area each have a rectangular shape.

\* \* \* \* \*